Patented Jan. 6, 1925.

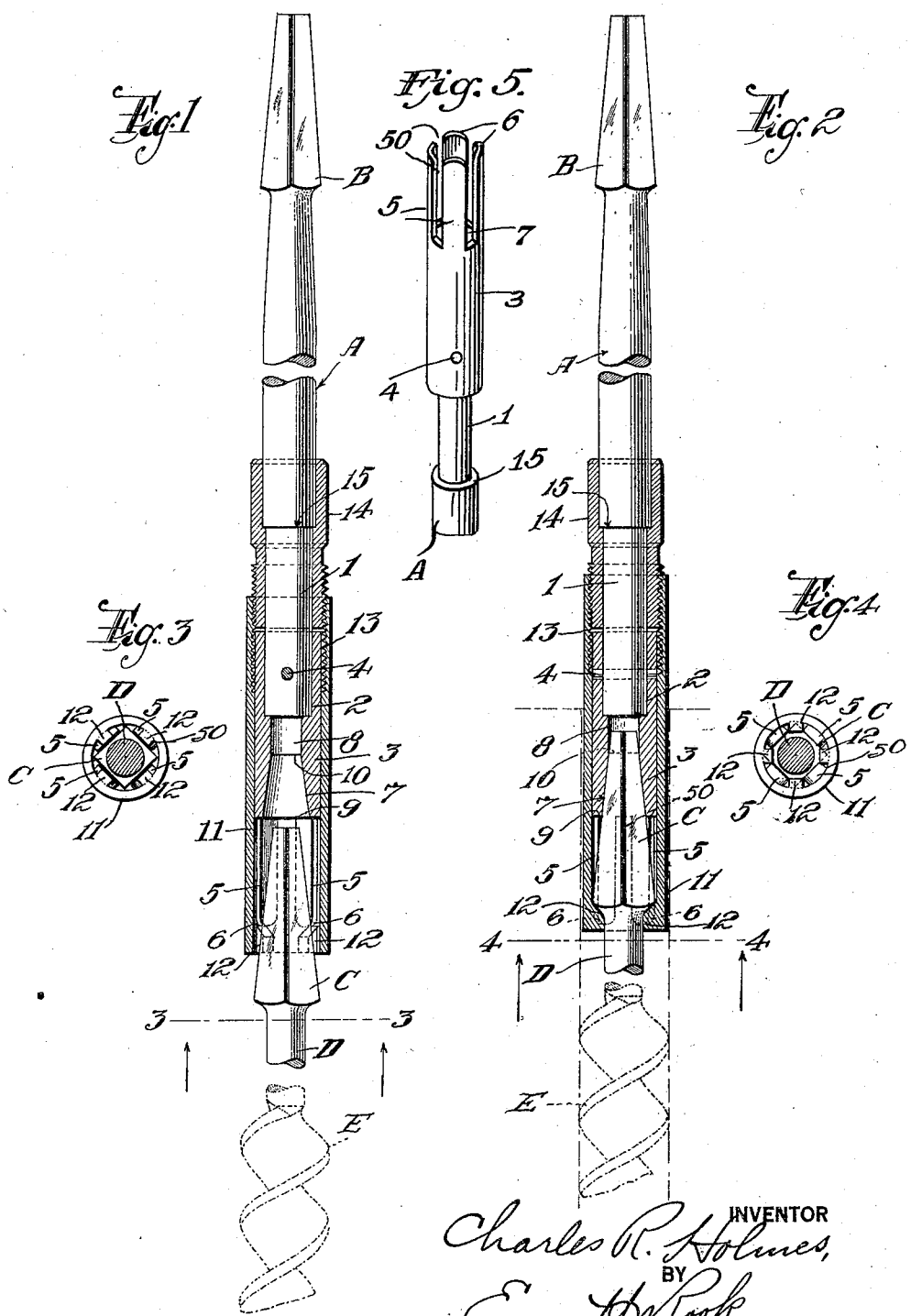

1,522,125

UNITED STATES PATENT OFFICE.

CHARLES R. HOLMES, OF NEWARK, NEW JERSEY.

EXTENSION HOLDER FOR BITS.

Application filed April 17, 1923. Serial No. 632,652.

*To all whom it may concern:*

Be it known that I, CHARLES R. HOLMES, a citizen of the United States, and a resident of Newark, in the county of Essex and State of New Jersey, have invented new and useful Improvements in Extension Holders for Bits, of which the following is a specification.

This invention relates in general to a bit holder adapted to be connected to a brace, handle or other operating mechanism to provide an extension for the bit when it is desired to use the bit in otherwise inaccessible places or where it is desired to bore a hole longer than the usual drill bit and shank. More particularly the invention relates to a chuck for holding the bit in an extension piece, although the chuck embodying the invention is equally well adapted for many other purposes.

One object of the invention is to provide a chuck of the character described embodying novel and improved features of construction which includes a small number of compactly arranged parts so that the chuck is of minimum size and can be used in restricted spaces and follow a drill bit through an unusually long opening; at the same time providing a strong, durable and simply operated holder for the bit.

Further objects of the invention are to provide a bit holder or chuck of this character comprising a body portion having a socket to receive a bit or the like and formed with a plurality of spaced fingers to prevent rotation of said bit; a sleeve longitudinally slidable and rotatable on said body portion and formed with lugs to enter between said fingers and engage said head of the bit shank and hold said shank in said body portion, and means on said body portion for positively sliding said sleeve on said body portion to permit the insertion of and positively hold a shank therein; to provide such a device which is inexpensive in construction; and to obtain other results and advantages as may be brought out by the following description.

Referring to the accompanying drawings, in which like numerals of reference indicate corresponding and like parts, Figure 1 is a longitudinal vertical sectional view through an extension holder and chuck for bits embodying my invention;

Figure 2 is a similar view showing the bit clamped within the chuck;

Figure 3 is an enlarged end elevation of the chuck showing the parts in the position shown in Fig. 1;

Figure 4 is a view similar to Fig. 3 showing the parts in the position shown in Fig. 2; and Figure 5 is a perspective view of the body portion of the chuck inverted with the actuating bushing and locking sleeve removed.

In the embodiment of the invention shown on the drawings, the reference character A designates the shank of an extension piece one end of which is provided with a polygonal and outwardly tapered head B to fit into the usual chuck of a brace, handle or other operating mechanism. The other end of said extension piece A is formed with a reduced portion 1 adapted to snugly fit within a correspondingly shaped opening 2 in one end of a sleeve 3, said sleeve being fixedly secured to said shank in any suitable manner as by means of a pin 4. The other end of said sleeve 3 is provided with a plurality of equidistantly circumferentially spaced longitudinally extending fingers 5 forming between them longitudinal parallel slots 50, the outer ends of said fingers being rounded or beveled as at 6. At the base of said fingers 5 the sleeve 3 is formed with two co-axial meeting openings 7 and 8 the outer one of which tapers inwardly from the bases 9 of said fingers to the other opening and provides a seat to receive the head C of the shank D of a bit E to be secured in the chuck. The external diameter of the sleeve 3 is preferably substantially equal to the diameter of a circle circumscribed on the larger end of said head C of the shank D of the bit E. The reduced portion 1 of the shank A and the sleeve 3 thus form a body portion for the chuck embodying my invention.

A locking sleeve 11 is longitudinally slidably and rotatably mounted on the sleeve 3, and the outer end of said locking sleeve is provided with a plurality of inwardly projecting lugs 12 corresponding in number to the fingers 5 and of a width adapted to fit in the slots 50 between the said fingers 5. The other end of said sleeve 11 is internally threaded at 13, preferably left-hand, to engage an externally threaded bushing 14 rotatably mounted on the reduced portion 1 of the shank A between a shoulder 15 and the inner end of the sleeve 3. The bushing 14 is thus substantially longitudinally fixed on the shank A except for a slight play necessary to permit easy rotation thereof.

In the operation of the chuck embodying my invention, when it is desired to insert a bit within the chuck, the bushing 14 is rotated to slide the locking sleeve 11 outwardly to remove the lugs 12 from between the fingers 5, after which the sleeve 11 is rotated to place said lugs 12 in substantial alinement with the respective fingers 5. The head C of the bit is then inserted with the corners thereof arranged between the fingers, as clearly shown in Fig. 3, the extremity of said head seating in the opening 7. The sleeve 11 is then rotated to bring the lugs 12 into alinement with the spaces between the fingers 5, whereupon the bushing 14 is rotated in the proper direction to slide the sleeve 11 inwardly and cause the lugs 12 to engage the inner end or shoulders of the head C of the bit, as shown in Fig. 4. The head C of the bit is thus forced into snug engagement with the seat 7 and thereby centered in the chuck, and is prevented from longitudinal movement out of the sleeve 3 by the lugs 12. Rotation of the head C in the sleeve 3 is prevented by the fingers 5 and by the engagement of the head with the seat 7 which is produced by the inward pull exerted on the head C as the sleeve 11 is forced inwardly by rotation of the bushing 14. To remove the bit from the chuck the bushing 14 is rotated to slide the sleeve 11 outwardly as above described for inserting the bit, after which the said sleeve is rotated to bring the lugs 12 into alinement with the fingers 5. The bit can then be easily shipped longitudinally outward from the sleeve 3.

It will be observed that this construction comprises a small number of compactly arranged parts, and enables the chuck to be made of a size easily adapted for use in extremely restricted places, or of a size smaller than the bit E so as to be adapted to follow said bit through an unusually long opening being bored by the said bit. Also, the chuck provides a strong and durable holder for the bit which will withstand all the hard usage to which such devices are usually subjected, and the operation of attaching a bit to or removing the same from the chuck is extremely simple.

The seat 7 centers the bit in the chuck and the fingers 5 and said seat effectively prevent wabbling of the bit in the chuck when the sleeve 11 is in locking position.

It will be understood that while I have shown the chuck or holder for use in connection with extensions for bits, it is equally well adapted for other purposes where a chuck of this character is desired, and furthermore, while I have shown the device used in connection with the drill bit E, the invention is also susceptible of use with any other type of bit, such as a screw driver or other similar devices or tools.

I have illustrated and described a chuck or bit holder embodying certain details of construction, but it will be understood that this is mainly for the purpose of illustrating the principles of the invention and that many modifications and changes can be made in the construction of the chuck without departing from the spirit or scope of the invention. Thereofore, I do not desire to be understood as limiting myself, except as required by the following claims when construed in the light of the prior art.

Having thus described the invention, what I claim is:

1. A device of the character described comprising two relatively longitudinally movable and rotatable members, one of which is provided with a socket to receive an article to be held and having a plurality of longitudinal slots therein, and the other of which is formed with a plurality of projections adapted to enter said slots and engage said article to hold the same against longitudinal movement out of said socket, and means for positively producing relative longitudinal movement of said members to cause engagement and disengagement of said projections with said article for clamping said article in or removing it from said socket.

2. A device of the character described including a body portion formed with a socket including a plurality of spaced fingers providing longitudinal slots therebetween, said socket being adapted to receive an article to be held, and a locking member having a longitudinally movable and rotatable relation with said body portion and formed with a plurality of projections adapted to enter through said slots and engage said article to hold it in said socket, and means for positively producing longitudinal movement of said locking member to cause engagement and disengagement of said projections with said article for clamping said article in or removing it from said socket.

3. A device of the character described including a shank having a reduced end portion with a shoulder at the inner end thereof, a body sleeve fixedly mounted on said reduced portion in spaced relation to said shoulder and formed with a plurality of longitudinally projecting circumferentially spaced fingers providing longitudinal slots therebetween, said body sleeve being adapted to receive an article to be held, a locking sleeve longitudinally slidable and rotatable on said body sleeve and formed with a plurality of inwardly projecting lugs to enter through said slots and engage said article to hold it in said body sleeve, and a bushing rotatably mounted on said reduced portion of the shank between said shoulder and the inner end of said body sleeve and having a threaded connection with said locking sleeve to longitudinally move the same on said body sleeve to cause engagement and disengagement of said projections with said article for clamping said article in or removing it from said socket.

4. A device of the character described comprising two relatively longitudinally movable and rotatable members, one of which is provided with a socket having a seat therein to receive an article to be held and formed with a plurality of longitudinal slots outwardly of said seat, and the other of which is formed with a plurality of projections to enter through said slots in opposed relation to said seat to clamp an object between said projections and said seat, and means for positively producing relative longitudinal movement of said members to cause engagement and disengagement of said projections with said article for clamping said article in or removing it from said socket.

5. A device of the character described including a body portion having a socket therein formed with a seat to receive an article to be held, said body portion being formed with a plurality of longitudinal slots outwardly of said seat and opening through the end of the body portion, a locking sleeve rotatable and slidable on said body portion and formed with a plurality of inward projections one of which is adapted to enter through each of said slots in opposed relation to said seat to engage said article and hold it on said seat, and means for positively producing longitudinal movement of said locking sleeve on said body portion to cause engagement and disengagement of said projections with said article for clamping said article in or removing it from said socket.

6. A bit holder of the character described including a body portion having a socket of a diameter less than that of a circle circumscribed on the large end of the polygonal head of the shank a bit, said socket having a seat and a plurality of equidistantly circumferentially spaced longitudinal slots opening through the end of said body portion, said slots being adapted to receive the corners of the head of a bit shank and guide said head to said seat in the socket, a locking sleeve rotatable and longitudinally slidable on said body portion and formed with inwardly projecting lugs to enter through said slots in opposed relation to said seat and engage the shoulders at the inner end of said head of said bit shank to hold said head in said seat, and means for positively producing longitudinal movement of said locking sleeve on said body portion to cause engagement and disengagement of said projections with said head for clamping said bit in or removing it from said socket.

CHARLES R. HOLMES.